United States Patent [19]

Fauck et al.

[11] Patent Number: 4,640,556
[45] Date of Patent: Feb. 3, 1987

[54] LOAD-DEPENDENT BRAKE PRESSURE REGULATOR FOR MOTOR VEHICLE AND/OR TRAILER BRAKE SYSTEMS

[75] Inventors: Gerhard Fauck, Hanover; Bernd Kiel, Wunstorf; Helmut Ulrich, Springe, all of Fed. Rep. of Germany

[73] Assignee: WABCO Westinghouse Fahrzeugbremsen GmbH, Hanover, Fed. Rep. of Germany

[21] Appl. No.: 679,417

[22] Filed: Dec. 7, 1984

[30] Foreign Application Priority Data

Dec. 12, 1983 [DE] Fed. Rep. of Germany ....... 3344839

[51] Int. Cl.$^4$ .............................................. B60T 8/22
[52] U.S. Cl. .................................... 303/22 R; 303/40
[58] Field of Search .............. 303/6 C, 7, 22 R, 23 R, 303/40, 54

[56] References Cited

U.S. PATENT DOCUMENTS 4,324,436   4/1982   Reinecke ........................... 303/22 R
4,418,965  12/1983   Reinecke ........................... 303/22 R

FOREIGN PATENT DOCUMENTS 2739884  3/1979  Fed. Rep. of Germany .

*Primary Examiner*—Duane A. Reger
*Attorney, Agent, or Firm*—J. B. Sotak

[57] ABSTRACT

The invention relates to a load-dependent brake pressure system for a pneumatically activated motor vehicle and/or motor vehicle trailer brake apparatus with an entrance device having an initial entrance phase in which the full control pressure is delivered to the cylinders of the wheel brakes. In an emergency situation, the supply pressure which is available on the vehicle must be able to be conveyed in a graduated and controlled manner as the brake pressure is applied to the wheel brakes. The present load-dependent brake pressure system which, in an emergency situation, makes possible the application of brake pressures which are higher than that corresponding to the control ratio up to the available delivery pressure, includes an entrance valve and piston, a control valve, a brake control piston, a relay valve, auxiliary valves, a control, delivery, brake pressure connections and chambers, and a valve tappet for controlling brake pressures in multiple phases.

18 Claims, 4 Drawing Figures

LOAD-DEPENDENT BRAKE PRESSURE REGULATOR FOR MOTOR VEHICLE AND/OR TRAILER BRAKE SYSTEMS

FIELD OF THE INVENTION

This invention relates to a load-dependent braking force regulator for motor vehicles and/or trailers having air brake systems.

BACKGROUND OF THE INVENTION

It will be appreciated that load-dependent braking arrangements have been previously proposed, such as, the automatically load-dependent brake pressure control device shown and disclosed in published German Patent Application DE-PS No. 27 03 945, which corresponds to British Pat. No. 1,548,838 of the above-noted patent.

Referring now to FIG. 3 in comparison to FIG. 1, it will be noted that the seal element or O-ring is missing. This load-braking force regulator delivers a brake pressure determined for the brake cylinders of one or more vehicle axles in relation to a control pressure originating from a brake valve. The pressure is not reduced in an initial entrance phase; and in subsequent control phase, the pressure is dependent upon a ratio which is a function of the load status of the vehicle, namely, the control ratio.

The control is carried out by means of a control valve which is activated by a control piston having a control surface pressurized by the control pressure and a reaction surface pressurized by the brake pressure. The size of the reaction surface can be varied as a function of the load. The reverse side of the reaction surface forms a variable accessory surface which is located adjacent to an accessory chamber which, together with the control surface, always has essentially the same size as the reaction surface.

In the entrance phase, both the control surface and the accessory surface are pressurized with the control pressure, and as a result the brake pressure is delivered unchanged in relation to the control pressure. After a predetermined entrance pressure is reached, the entrance device prevents any further increase of the pressure in the accessory chamber. The further increase of the brake pressure in the subsequent control phase is a function of the ratio of the surface areas between the reaction surface and the control surface which varies with the size of the reaction surface, also as a function of the load.

The family of characteristic curves of this load-dependent brake force consists in the control phase of a family of control lines which always correspond to a load status of the vehicle.

There are applications for vehicles in which, for example, on account of government regulations, it is necessary in emergency situations that the brake pressure in the vehicle must be able to increase in stages up to the full available delivery or supply pressure. Since on vehicles with load-dependent brake devices, the type of brake pressure mentioned above cannot increase beyond that which corresponds to the load status, this requirement can be met on vehicles equipped in this manner only if additional separate valve and/or equipment is used as adjunct.

OBJECTS AND SUMMARY OF THE INVENTION

This problem is alleviated by the present invention and therefore results in the improvement of a load-dependent braking apparatus of the type described above, so that the above-mentioned requirement can be fulfilled with simple means and without separate ancillary valves and/or control equipment.

The concept of the invention is to define an emergency braking situation by a predetermined value of the control pressure, and after this value is exceeded, to increase the braking pressure so that the valid control characteristics go in the direction of a higher braking pressure, until the pressure reaches the full available delivery pressure.

In order to achieve such characteristics, it is possible that, upon the occurrence of the control pressure representing an emergency situation, to have the brake control apparatus intervene and convey the load status; e.g., to cause a mechanical transmission to move the control lever in the "full load" direction by means of the brake control apparatus.

The preferred embodiments of the invention are quite unique and are handled in an altogether advantageous manner by dealing with the problem in the area of the entrance device.

This means that the invention has a particularly simple configuration by simply utilizing a predetermined absolute value of the control pressure to define the emergency situation.

For the definition of the emergency situation, a predetermined ratio will exist between the control pressure and the delivery pressure which can be used, even with a fluctuating delivery pressure, so that the advanced control capability of the delivery pressure to the brakes is always guaranteed.

In a preferred embodiment, it is recommended, after the initiation of the emergency situation, that by means of special design features of the entrance device, that another entrance phase is simulated. In another embodiment, a "second entrance phase" will be initiated by use of an additional auxiliary valve which is connected between the entrance device and an accessory chamber.

In the unique load-dependent air brake pressure control system, there is provided a graduated chamber which is pressurized with the control pressure which can advantageously be situated in the entrance device. Before the initiation of the emergency situation, the control phase brings about an increasing exhaustion of the accessory chamber, which is pressurized with the control pressure so that the range of possible control ratios of the load-dependent brake apparatus is expanded.

The load-dependent air brake apparatus, as described by the invention, can also be advantageously included in the same housing with a relay valve, so that the reaction surface of the wall of the outlet chamber, which is opposite to the brake pressure control piston, is designed as a relay piston. This relay valve, depending on the design, can have a ratio of the modulated brake pressure to the control pressure of 1 and can advantageously also be designed to increase or decrease the pressure.

According to the invention, there is provided a load-dependent air brake pressure system for pneumatically-activated motor vehicles and/or trailer brakes comprising, a load-dependent brake pressure controller which is regulated by control pressure modulated by a brake valve, an entrance device for controlling the load-dependent brake pressure controller up to a predetermined control pressure for delivering the full control pressure as a function of the controlled pressure, means for increasing the controlled pressure in accordance with a value corresponding to the control ratio up to the full available supply pressure, and means effectively controlled when a predetermined control pressure is exceeded.

BRIEF DESCRIPTION OF THE DRAWINGS

The invention will now be described in more detail with reference to example embodiments which are illustrated in the drawings.

FIG. 1 shows a load-dependent brake control device (ALB) or brake force controller with an entrance valve and control characteristics which, in emergency situations, deflect in the direction of higher braking pressures.

DETAILED DESCRIPTION OF THE INVENTION

Figure 1:
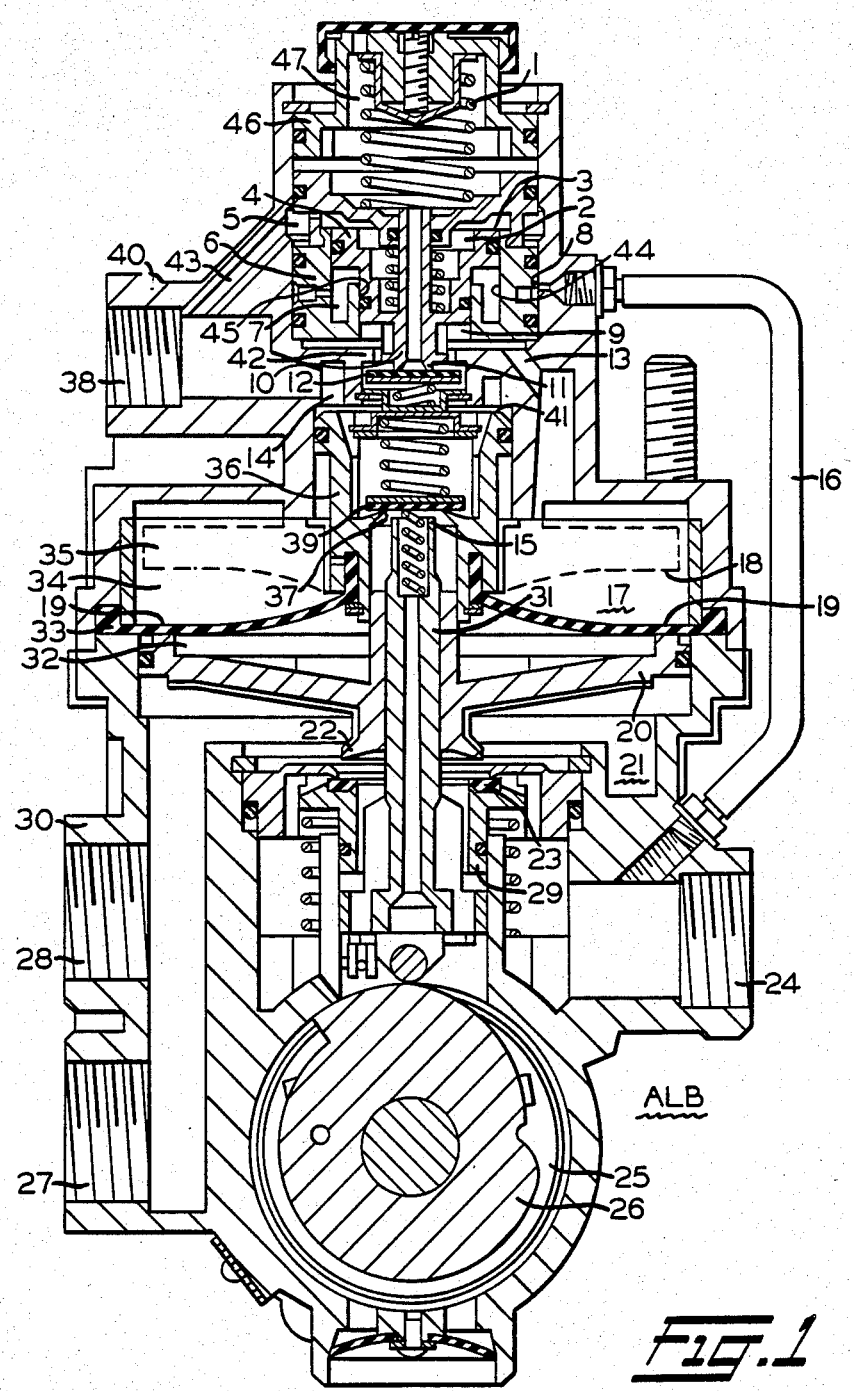
FIG. 1 shows a load-dependent brake apparatus with an entrance device and a relay valve.

Referring now to the drawings, and in particular to FIG. 1, there is shown a load-controlled brake regulator which includes a housing 30, 40, namely, an upper housing 40 and a lower housing 30. The housing 30, 40 houses a control piston 36, a flexible diaphragm 33 and a control valve 15, 37, 39. The control valve is formed by a double valve body 39, a valve seat 37 located on the inner wall of the control piston 36, and another valve seat 15 which is located on the upper end surface of a valve tappet or push rod 31 designed as a control element and located under the double valve body 39.

As shown, a control piston 36 is connected to a number of radial ribs 35 which are engaged in a contact-free manner with the corresponding ribs 34, which are arranged in the upper housing 40 and the lower housing 30. The end faces 18 of the ribs 35 and the end faces 19 of the ribs 34 facing the diaphragm 33 form parts of a tapered casing; and in the position shown, the upper surface of diaphragm 33 is in contact with the end faces 19.

The control piston 36 and the diaphragm 33 form a brake pressure control piston 33, 36, with an upper control face 41 and a reaction face pressurized by the pressure modulated by the control valve 15, 37, 39. The control face 41 consists of the upper side of the control piston 36. The reaction face consists of the underside of the diaphragm 33. The control face 41 adjoins a control chamber 14 which is connected to the control connection 38 in the upper housing 40. The upper side of the diaphragm is designed as an accessory surface, and forms, with the upper housing 40, an accessory chamber 17 which is sealed off from the control chamber 14. The lower reaction face, along with the longitudinally movable relay piston 20, form a sealed outlet chamber 32 in the lower housing 30.

The valve push rod or tappet 31 is in frictional contact with a cam 26 which can be adjusted in a manner (not shown) as a function of the load. The valve push rod 31 is in communication via an inner hollow passageway from which air can be removed by way of a chamber 25 in which the cam 26 is located. The tappet 31 is guided in a sealed manner in the relay piston 20. It will be seen that located below the relay piston 20 in the lower housing 30, there is a double valve designed as a relay valve 22, 23, 29. The valve body 29 is hollow and is in communication with the chamber 25. The valve tappet 31 passes through the hollow valve 29 and enters chamber 25.

As shown, supply or reservoir connection 24 can be put in communication with a reaction chamber 21 by way of relay valve 22, 23, 29.

The reaction chamber 21 feeds the brake or delivery connections 27, 28 which lead to the brake cylinders. The supply connection 24, the reaction chamber 21, and the brake or delivery connections 27, 28 are located in the lower housing 30. As shown, there is an entrance apparatus located in the upper end of the upper housing 40. The entrance device includes a two-part entrance piston 6, 46, 4 guided in a sealed manner in the upper housing 40. The entrance piston 6, 46, 4 consists of a hollow outer part 6, 46, whose inside circumferential surface is designed as a graduated hole 44, 45, and of an inner part which is guided so that it can move longitudinally in the outer part 6, 46. The inner part is designed as a hollow graduated piston 4 complementary to the graduated hole 44, 45, and the radial outer graduated surface of the piston is sealed against the corresponding surface of the graduated hole 44, 45. On its upper, larger end surface, which is designed as an auxiliary control surface 3, the graduated piston 4 exhibits an outlet sleeve connected with its inner chamber by means of which the end portion 46 of the outer part 6, 46, designed as an end wall 46, protrudes in a sealed manner into an exhaust chamber 47 located above the outer part 6, 46. The end portion 46 and an external body 6 are joined together by a snap connection sealed to the outer part 6, 46.

On its lower, smaller end surface, the graduated piston 4 includes a hollow valve tappet or rod 10 connected with its inner chamber on which is formed an outlet valve seat 11. The rod and the graduated piston 4 activate an entrance valve 11, 12, 42 which is designed as a double valve. On its external surface, the outer part 6, 46 exhibits two circular grooves located on top of one another by means of which the corresponding guide surfaces of the upper housing 40 enclose a sealed first outer annular chamber 5 and a sealed second inner annular chamber 8. The first annular chamber 5 is in communication with the control connection 38 via a channel 43, and the second annular chamber 8 is in communication with the supply connection 24 via an external channel 16.

It will be seen that located between the auxiliary control surface 3 of the graduated piston 4 and the end wall 46 is enclosed an auxiliary control chamber 2 which is in communication with the first annular chamber 5. Further, it will be observed that located between the outer part 6, 46 and the graduated piston 4 is a holding chamber 7 which is connected to the second annular chamber 8.

As shown, an entrance chamber 9 is enclosed between the outer part 6, 46, the graduated piston 4, and the upper housing 40 which can be put in communication via an inlet valve 12, 42 of the entrance valve 11, 12, 42 and through a clearance channel 43 to the control connection 38 and through another channel 13 to the accessory chamber 17. By means of an adjustable control spring 1, supported between the upper cover of the exhaust chamber 47 and the end wall 46, the entrance piston 6, 46, 4 is biased toward an open direction of the inlet valve 12, 42 and simultaneously biased toward a closed direction of the outlet valve 11, 12 of the entrance valve 11, 12, 42.

The load-controlled braking apparatus ALB, described above, functions as follows:

The pressure or supply connection 24 is connected to a suitable supply reservoir (not shown) and the brake connections 27, 28 are connected to the cylinders of the wheel brakes (not shown). The delivery connection 38 is in communication with the outlet of a brake valve (not shown) which is also connected on the pressure or supply side with the reservoir.

The holding chamber 7 is pressurized by way of the connecting tube 16 and the second annular chamber 8 with the supply pressure from the reservoir.

The size of the reaction surface of the brake pressure control piston 33, 36, and thus the surface ratio between the reaction surface and control surface 41, and the control ratio are a function of the position of the valve tappet 31 which is determined as a function of the load by the cam 26. Depending on the position of the valve tappet or rod 31, a more or less large portion of the reaction surface is taken up by the lower end surfaces 19 of the ribs 34 which are fixed to the housing and is thus varied during pressurization as a portion of the active reaction surface.

Now when the controller ALB is at rest, that is, when the vehicle is not being braked, the control chamber 14 is vented. The inlet valve 37, 39 of the control valve 15, 37, 39 is closed, and the inlet valve 15, 39 of the control valve 15, 37, 39 is opened.

The inlet valve 23, 29 of the relay valve 22, 23, 29 is also closed, and the outlet valve 22, 29 of the relay valve 22, 23, 29 is opened. The outlet valve 11, 12 of the entrance valve is closed while the inlet valve 12, 42 is opened. In this position of the valves, the reaction chamber 21 is vented by way of the passageway in the valve tappet 31 and the exhaust chamber 25. Also, the cylinders of the wheel brakes are vented via the brake connections 27, 28 and the outlet valve 22, 29 of the relay valve through the exhaust chamber 25. Likewise, the accessory chamber 17 is vented via the housing duct 13 through the entrance chamber 9, and through the opened inlet valve 12, 42 to the control connection 38.

The holding chamber 7 of the entrance device is pressurized via the connected tube 16 and the second annular chamber 8 by the supply pressure from connection 24, so that the graduated piston is held against a stop formed on the end wall 46 of the outer part 6, 46.

When the control chamber 14 is pressurized with a control pressure delivered by the brake valve, the function of the controller ALB operates in three stages as the control pressure is increased.

If the control chamber 14 is pressurized via the control connection 38 with the control pressure, then the control piston 36 is displaced downward. Thus, the outlet valve 15, 39 is closed and the inlet valve 37, 39 is opened. The control air flows through the opened inlet valve 37, 39 into the outlet chamber 32 to pressurize the underside reaction surface of the diaphragm 33 as well as the upper side of the relay piston 20. The relay piston 20 operates the relay valve 22, 23, 29 which allows the pressurization of the reaction chamber 21 and causes air pressure to flow to the brake connection 27, 28 and, in turn, to the cylinders of the wheel brakes. The amount of this brake pressure is essentially equal to the pressure level in the outlet chamber 32.

In any given construction of the relay valve in which the pressure must be increased or decreased, the brake pressure will be a ratio which is determined by the pressure in the outlet chamber 32. Accordingly, this statement should be kept in mind during the discussion of the following operating phases.

During the initial introductory operating entrance phase, which is characterized by low control pressures, control air flows into the accessory chamber 17 simultaneously via the passageway or channel 43 through the opened inlet valve 12, 42 and via the passageway or channel 13. In addition, the control air flows into the auxiliary control chamber 2 via passageway 43. During this phase, the pressure which builds up in the outlet chamber 32 corresponds to the full control pressure, and the relay valve 22, 23, 29 supplies the brake connections 27, 28 with a brake pressure which is essentially identical to the control pressure. The control pressure can also take the path described above into the accessory chamber 17 until it reaches a value at which the force of the control spring 1 is overcome. This pressure value is the entrance pressure. When the entrance pressure is reached, the entrance piston 6, 46, 4 is moved against the force of the control spring 1 upward into a position in which the control valve 11, 12, 42 assumes a closed position. A further pressure increase in the accessory chamber 17 with increasing control pressure is thereby initially prevented.

During the subsequent operating phase, let us assume that the control pressure continues to increase so that the pressure in the outlet chamber 32 is regulated, and thus the braking pressure to the brake or delivery connections 27, 28 is proportional to the ratio of the control surface 41 to the reaction surface. The pressure in the accessory chamber 17 remains constant during this control phase.

During further increase in the control pressure, the graduated piston 4 remains at its stop on the end wall 46 of the outer part 6, 46 as long as the auxiliary control force exerted by the control pressure in the auxiliary control chamber 2 on the auxiliary control surface 3 of the graduated piston 4 remains less than or equal to the supply force exerted by the delivery pressure in the holding chamber 7 on the stop of the graduated piston 4, plus the additional supply force resulting from the entrance pressure on the lower surface of the graduated piston 4.

The advanced control phase, namely, the third phase, begins when the control pressure has increased to a value at which the sum of the supply forces is overcome by the auxiliary control force. The graduated piston 4 is now moved downward and opens the inlet valve 12, 42 whereby additional control air can flow into the entrance chamber 9 and the accessory chamber 17 until the graduated piston 4, under the action of the increased pressure in the entrance chamber 9, moves back against the auxiliary control pressure whereby the entrance valve 11, 12, 42 again assumes a closed position. The pressure increase in the entrance chamber and in the accessory chamber 17 is determined by the surface ratio on the control piston 4.

The pressure increase in the accessory chamber 17 is followed by a corresponding pressure increase in the outlet chamber 32, at which point the relay valve 22, 23, 29 also releases a correspondingly increased brake pressure. The pressure increase in the accessory chamber 17 results in a deflection of the control characteristic determined by the load status of the vehicle to higher brake pressures, whereby the slope of the deflected segment of the control characteristic is determined by the surface ratio on the graduated piston 4.

Figure 2:
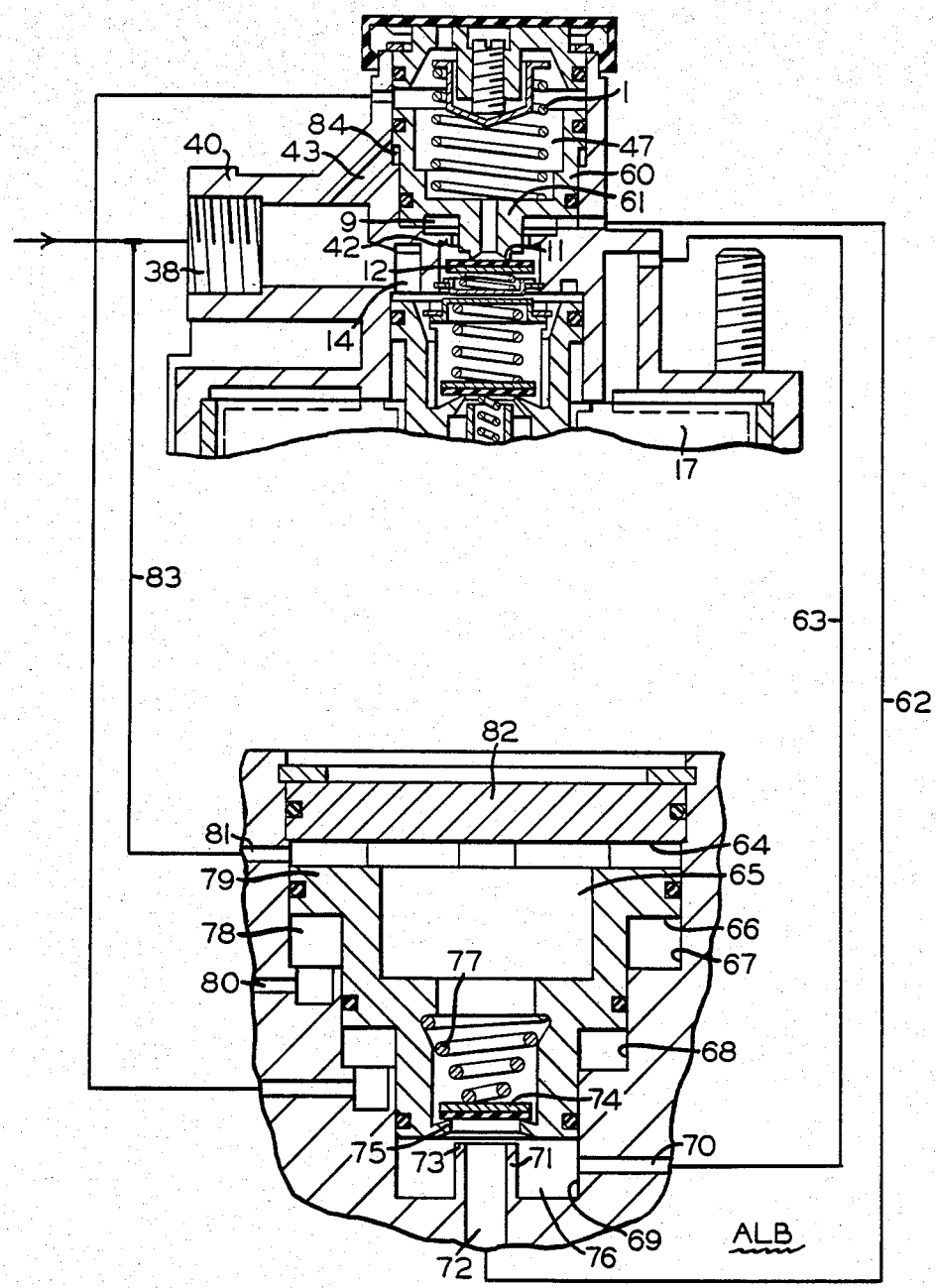
FIG. 2 shows a section of a load-dependent brake apparatus with an entrance device with a schematically represented auxiliary valve.

Referring now to FIG. 2, there is shown the detail of another exemplified embodiment which has essentially the same entrance apparatus, and, with schematically-indicated connection channels and an auxiliary valve.

In the following explanation of this second embodiment, it will be understood that the reference numbers from FIG. 1 will be used to indicate items with the same function as those in FIG. 1.

As shown, the entrance device is again located in the upper portion of the upper housing 40 and consists of an entrance piston designed as a graduated piston 60, as well as the entrance valve 11, 12, 42 formed of the inlet valve 12, 42 and the outlet valve 11, 12.

It will be seen that there is located between the entrance piston 60 and the upper housing 40 an entrance chamber 9 and a graduated chamber 84 which are sealed off from one another. The graduated chamber 84 is in communication via the passageway or channel 43 with the control port or connection 38, while the entrance chamber 9 can be connected on one hand via the inlet valve 12, 42 with the control chamber 14 and on the other hand via a schematically illustrated supply chamber 63 with a connection 76 of the auxiliary valve.

As shown, the exhaust chamber 47 is located above the entrance piston 60, and the entrance chamber 9 is in communication with a hollow tappet 61. The tappet 61 cooperates with the outlet valve seat 11. The tappet 61 is carried by the entrance piston 60. Thus, the entrance chamber 9 is in communication with chamber 47 when the outlet valve 11, 12 is opened. An adjustable control spring 1 is located in exhaust chamber 47 and is supported between the entrance piston 60 and the cover of the exhaust chamber 47. The biasing spring 1 is prestressed and biases the entrance piston 60 in the opening direction of the inlet valve 12, 42.

The auxiliary valve can be an integral part of either the upper housing 40 or the lower housing, not characterized, or can be located in its own separate housing. The auxiliary valve includes a three-stage graduated piston 79 open on the inside and guided longitudinally in a sealed manner in a three-stage graduated hole 67, 68, 69. The radial outside surfaces of the graduated piston 79 are sealed against the corresponding hole surfaces of the graduated hole 67, 68, 69. The graduated piston 79 includes a small diameter collar on its lower end. The collar includes a first valve seat 75 directed upwardly toward the inside of the graduated piston 79. The valve seat 75 cooperates with a double valve element 74 which is biased downwardly by a closing spring 77. The biasing spring 77 is braced against the inner upper lip of the graduated piston 79. The double valve element 74 cooperates with the first valve seat 75 to form a first auxiliary inlet valve 74, 75, and with a second valve seat 73 which is internally located in the housing of a second auxiliary inlet valve 73, 74. The graduated bore 67, 68, 69 is sealed closed on its upper end with the large diameter by a sealing plate 82. The underside of the plate 82 acts as a stop 64 for the graduated piston 79. As shown, a control chamber 65 is formed between the sealing plate 82 and the inside of the graduated piston 79. The control chamber 65 is connected to control connection 38 via a passageway or port 81 and a schematically illustrated communication channel 83.

As shown, a step is formed between the large and medium diameters of the graduated piston 79. The step includes an under surface 66 which cooperates with the lower housing to form a holding chamber 78 which is in communication with a lower connection 80.

The graduated piston 79 is closed at its lower end by the double valve element 74 which is urged downwardly by the biasing spring 77. A holding chamber 76 is formed between the end of the graduated piston 79 and the lower end of the graduated hole 67, 68, 69. As shown, a hollow tappet 71 is located opposite the double valve element 74 in the connection chamber 76. The tappet 71 is formed on the inner bottom end of the housing and is connected to an inlet port 72. As previously noted, the upper edge of tappet 71 forms the second valve seat 73. The holding chamber 76 is in communication with the accessory chamber 17 via an accessory outlet 70 and a schematically illustrated connecting channel 63.

The inlet port 72 is connected through a schematically illustrated connecting channel 62 to the entrance chamber 9.

The operation of the embodiment illustrated in FIG. 2 differs from the operation of the embodiment illustrated in FIG. 1. The holding chamber 78 is in constant communication through the connection 80 with the pressure reservoir (not shown) so that a holding force is exerted on the reaction surface 66 of the graduated piston 79 in the direction of the stop surface 64.

It will be seen that the chamber enclosed by the step portion formed by the medium and the small diameter of graduated piston 79 and by the graduated hole 67, 68, 69 is in communication with the exhaust chamber 47.

During the entrance control phases, the entrance chamber 9 is in communication through the connecting channel 62, through the inlet 72, through the opened second inlet valve 73, 74, through the connection chamber 76 and through the connecting channel 63 to the accessory chamber 17.

During the control phase, the pressure in the accessory chamber 17 is reduced because the control pressure acting in the graduated chamber 84 overcomes the force of the control spring 1 in a proportion to the increase of the control pressure. This causes the controller ALB to develop high control ratios.

It will be appreciated that a graduated chamber can also be included in the embodiment illustrated in FIG. 1. This can be accomplished by making the diameter of the outer part 4, 46 located above the first annular chamber 6 in that embodiment larger.

The pressure in the accessory chamber 17 and acting on the lower surface of the graduated piston 79 functions as a further restoring force.

During the advanced control phase, the control pressure acting on the upper surface of the graduated piston 79 in the control chamber 65 overcomes the sum of the restoring forces. The graduated piston moves away from the stop face 64 and travels downward to close the second auxiliary inlet valve 73, 74 and to open the first auxiliary inlet valve 74, 75. Thus, the fluid connection between the entrance chamber 9 and the accessory chamber 17 is thereby closed, and a fluid connection is established between the control chamber 65 and the accessory chamber 17. The pressure in the accessory chamber 17 can increase until the restoring forces on the graduated piston 79 move it back whereby a double valve 73, 74, 75, formed by the first auxiliary inlet valve 74, 75 and the second auxiliary inlet valve 73, 74, cause the level of the pressure in the accessory chamber 17 to be regulated according to the surface ratios on the graduated piston 79.

The increase of the pressure in the accessory chamber 17 influences the control behavior of the load-dependent brake system in the same manner as described in the embodiment illustrated in FIG. 1.

It is apparent that the load-dependent brake control systems, as described above for both embodiments, can work without an integrated relay valve 22, 23, 29. In this case, the relay piston would have to be designed as a fixed housing wall, and the outlet chamber 32 enclosed between this housing wall and the underside of the diaphragm 33 would have to be equipped with a connection to the wheel brakes or to a separately located relay valve.

Figure 3:
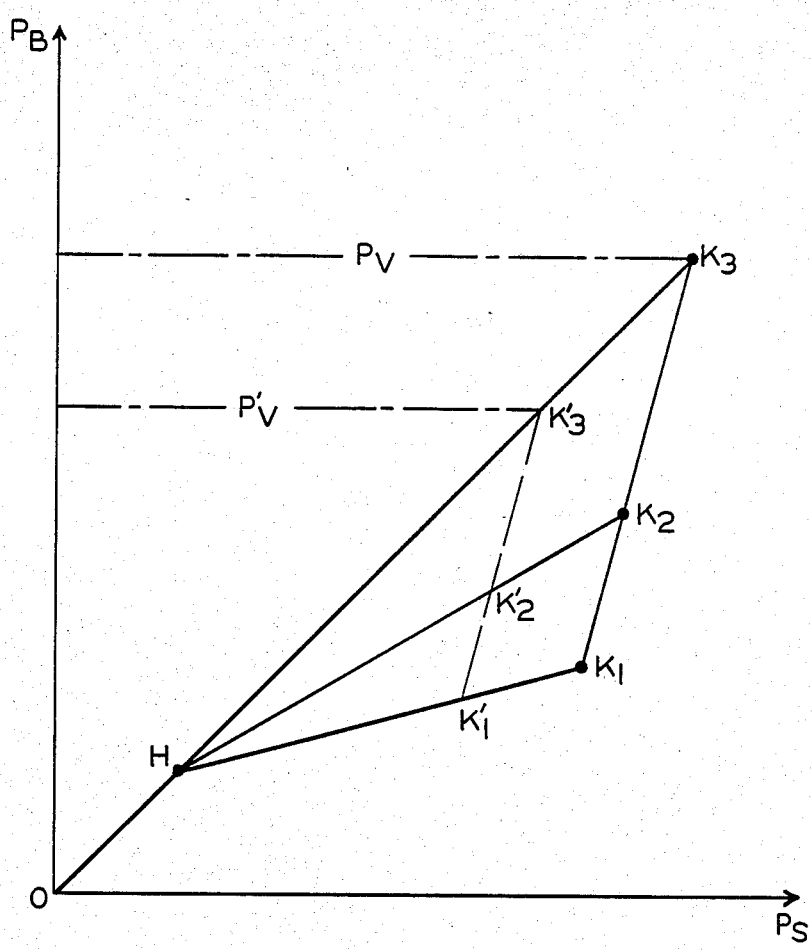
FIG. 3 shows a graphic illustration of the family of characteristic or response curves representative of the operations of the embodiments illustrated in FIGS. 1 and 2.

Referring now to FIG. 3, there is shown a graphic illustration of a family of characteristic curves of the two embodiments shown and described in FIGS. 1 and 2.

On examples with integrated pressure-increasing or pressure-reducing relay valves, the characteristic curves and the following remarks will change accordingly, as will be apparent to those skilled in the field.

In viewing FIG. 3, it will be seen that the brake pressure, symbolized by $p_B$, is plotted on the ordinate axis; and the control pressure coming from the brake pressure, symbolized by $p_S$, is plotted on the abscissa axis. A dashed line parallel to the abscissa axis symbolizes the delivery pressure, symbolized by $p_V$, which is specified as constant.

The section of line OH represents the entrance phase. In this phase, pressure $p_B$ is essentially equal to pressure $p_S$. With the same pressure scales on the ordinate and the abscissa, the segment OH runs at an angle of 45° relative to both coordinates.

In the control phase, the control characteristics for the partly-loaded vehicle are deflected in the direction of lower values for $p_B$ from the 45° line, with H as the salient point, whereby all of the control characteristics are represented as a series of lines with H as the point of origin.

As illustrated, the series of lines are the control characteristic curves for the unloaded vehicle $HK_1$, for the partly-loaded vehicle $HK_2$, and for the fully-loaded vehicle $HK_3$, all without taking into consideration dynamic axle load shifts.

The characteristic $HK_3$ for the fully-loaded vehicle is essentially an extension of the entrance characteristic OH and shows that the control pressure $p_S$ is essentially set at the full brake pressure $p_B$. The point $K_3$ is the modulation point, in which $p_B$ is essentially equal to the delivery pressure $p_V$, and beyond which $p_B$ cannot be increased any further.

In the advanced control phase, the load-dependent control characteristics HK, with the exception of that for the fully-loaded vehicle, deflect sharply in the direction of higher brake pressures $p_B$ and run on a new characteristic line at a sharp angle to the modulation point $K_3$. In the advanced control phase, the line $K_1 K_3$ is the control characteristic for the unloaded vehicle, and the line $K_2 K_3$ is the control characteristic for the partly-loaded vehicle. The control characteristics for the vehicle in other load statuses are deflected correspondingly, whereby the salient points always lie on the line $K_1 K_3$.

The position of the salient point K can be determined by the absolute value of the delivery pressure as well as by the surface ratios of the entrance piston 6, 46 in the embodiment illustrated in FIG. 1, and by the surface ratios of the graduated piston 79 of the auxiliary valve in the embodiment illustrated in FIG. 2. The slope of the line $K_1 K_3$ can be determined by the above-mentioned surface ratios. If there is a decrease or an increase in the delivery pressure in the vehicle, the beginning of the advanced control phase is shifted to lower or higher values for pressure $p_S$.

One example of such a case is characterized by the dashed line $K'_1 K'_2 K'_3$. In this case, the delivery pressure, once again specified as constant, has dropped to a value $p'_V$. As a result, the beginning of the advanced control phase for the unloaded vehicle is shifted from the control pressure $p_S$, characterized by the point $K_1$, to a lower value characterized by the point $K'_1$. The intersections K' of the other load-dependent control characteristics, e.g., $K'_2$ and the modulation point $K'_3$, shift accordingly. The advanced control phase of the load-controlled brake pressure regulation system corresponds to the emergency situation. FIG. 3 clearly shows that in this emergency situation, independent of the control ratio of the controller ALB and independent of the level of the delivery pressure, a brake pressure higher than that corresponding to the currently applicable control ratio up to the full available delivery pressure, can be rapidly, gradually and safely delivered to the cylinders of the wheel brakes.

Figure 4:
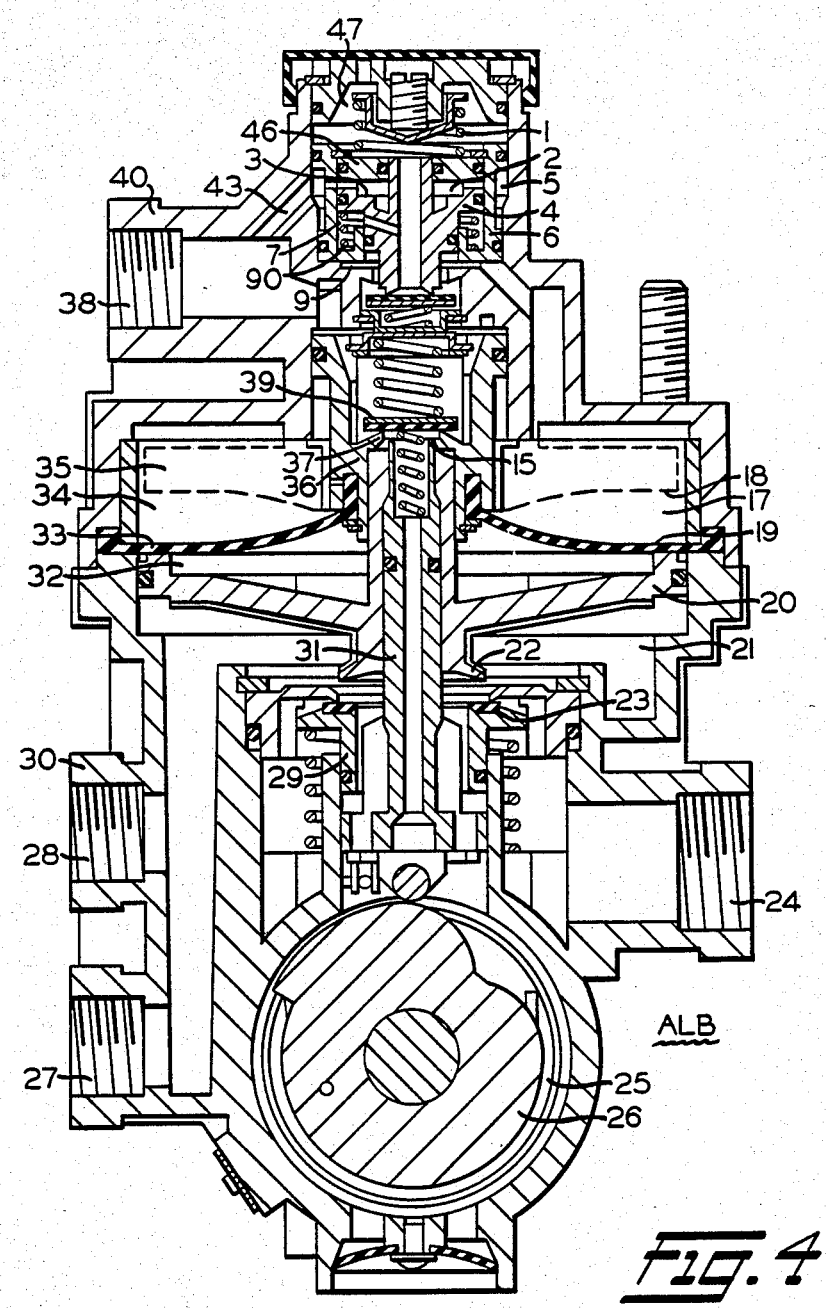
FIG. 4 shows a load-dependent brake apparatus with an entrance device and relay valve.

Referring now to FIG. 4, there is shown another embodiment of a load-dependent brake pressure regulation device, according to the invention, with an entrance device and relay valve.

In this embodiment, like in the embodiment illustrated in FIG. 1, the apparatus includes the two-part entrance piston 6, 46, 4, the entrance valve, the control valve, the brake pressure control piston, relay piston, the relay valve, the control connection, the delivery connection, and the brake connections and valve tappet have the same function and are identified with the same reference numbers as in FIG. 1.

As previously mentioned, the same reference numbers will be used for items which have the same function as in the embodiment illustrated in FIG. 1.

The holding chamber 7 is enclosed by the two part 6, 46 and the graduated piston 4 of the entrance piston 6, 46, 4 is, in this embodiment, not connected with the reservoir, but is connected by a transverse boring formed in the graduated piston 4 to the exhaust chamber 47 which is vented to the atmosphere. As shown, biasing spring 90 is located in the holding chamber 7. The biasing control spring 90 is situated between the graduated piston 4 and the outer part 6, 46 which preloads the graduated piston 4 and the outer part 6, 46 against the control pressure which is exerted on the auxiliary control surface 3. As shown, there is only a first annular chamber 5 which is located between the outer cylinder surface of the outer part 6, 46 and the corresponding guide surface of the housing 40, and which is pressurized with the control pressure. The second annular chamber 8, which was normally pressurized by the delivery pressure which is shown in the embodiment illustrated in FIG. 1, is omitted. The upper surface area of the outer part 6, 46 for the first annular chamber 5 is larger than the lower surface area so that the first annular chamber 5 in this embodiment is designed as a graduated chamber.

In terms of function, this embodiment differs from the embodiment illustrated in FIG. 1 as a result of the fact that the reaction force in the holding chamber 7 on the step of the graduated piston 4 is applied, not by the delivery pressure, but by the control spring 90. Referring now to the family of characteristic curves (shown in FIG. 3), this means that the position of the salient points K, at a given surface ratio on the graduated piston 4, is a function only of the absolute value of the control pressure $p_S$. This also means that an advanced control phase occurs only as long as the delivery pressure $p_V$ is higher than that of the salient point K of the appropriate control pressure $p_S$ corresponding to the control line. In this embodiment, therefore, the emergency situation is defined by the absolute value of the control pressure $p_S$.

The design of the first annular chamber 5 as a graduated chamber, means that the control pressure acting in this chamber will take over with increasing values and will increase in proportion to the force of the control spring 1, so that the pressure in the entrance chamber 9 and in the accessory chamber 17 can drop. This means that particularly high control ratios of the controller ALB are possible. Again, referring to the family of characteristic curves (shown in FIG. 3), this means that the line $HK_1$ lies lower, and the set of lines of the control characteristic curves have a larger acute angle at H.

The embodiment illustrated in FIG. 2 may be modified, wherein the reaction surface 66 of the graduated piston 79 of the auxiliary valve, instead of being pressurized by the delivery pressure, may be pressurized with atmospheric pressure. In this case, the reaction chamber 78 is provided with a biasing control spring which is caged between the retaining surface 66 and the corresponding housing step. Thus, the function and the control action of the embodiment illustrated in FIG. 2 are thereby changed and correspond to the above remarks concerning the embodiment illustrated in FIG. 4.

It will be apparent to one skilled in the field that the embodiment illustrated in FIG. 2 may also be provided with an integral relay valve, and that the embodiment illustrated in FIG. 4 can be provided with an appropriate valve which increases or decreases the pressure to assume a neutral position.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed. It will be understood that variations, modifications, equivalents and substitutions for components of the above specifically-described embodiment of the invention may be made by those skilled in the art without departing from the spirit and scope of the invention as set forth in the appended claims.

Having thus described our invention, what we claim as new and desire to secure by Letters Patent, is:

1. A load-dependent air brake pressure system for pneumatically activated motor vehicles and/or trailer brakes comprising,
   (a) a load-dependent brake pressure controller which is regulated by control pressure modulated by a brake valve;
   (b) an entrance device for controlling the load-dependent brake pressure controller up to a predetermined control pressure for delivering the full control pressure as a function of the controlled pressure;
   (c) means for increasing the controlled pressure in accordance with a value corresponding to the control ratio up to full available supply pressure; and
   (d) means for effectively controlling said means for increasing the controlled pressure when a predetermined control pressure is exceeded.

2. The load-dependent air brake pressure system, according to claim 1, wherein:
   (a) a graduated brake pressure control piston having a small surface in a control chamber pressurized with the control pressure and having a variable reaction surface in an outlet chamber pressurized with the regulated pressure modulated by a control valve which corresponds to the brake pressure exerted in the wheel brakes; and
   (b) a control valve for connecting the control chamber to the outlet chamber or connecting the outlet chamber to the atmosphere, the control valve is activated by the brake pressure control piston having a control ratio which can be adjusted as a function of the load by means of a control element.

3. The load-dependent air brake pressure system, according to claim 2, wherein:
   (a) the entrance device includes an entrance valve having an inlet valve and an outlet valve, whereby the inlet valve controls a connection between the control chamber and an entrance chamber which is connected with an accessory chamber that is bordered by the back side of the reaction surface, and this connection closes above a predetermined control pressure, and whereby the outlet valve controls a connection between the entrance chamber and the atmosphere;
   (b) the entrance valve includes a double valve element and an entrance piston having an end surface bordering the entrance chamber; and
   (c) the entrance valve of the entrance piston is biasing toward an open position by an adjustable control spring.

4. The load-dependent air brake pressure system, according to claim 3, wherein a working means is cooperatively associated and connectable with the entrance device.

5. The load-dependent air brake pressure system, according to claim 4, wherein the working means is cooperatively associated and connectable with the entrance piston.

6. The load-dependent air brake pressure system, according to claim 5, wherein the working means includes the entrance piston having two parts which are biased against one another by the supply pressure, and when pressurized by the control pressure upon reaching a predetermined ratio between control pressure and supply pressure, the two parts are pushed together whereby the one part of the entrance piston activates the entrance valve.

7. The load-dependent air brake pressure system, according to claim 6, wherein:
   (a) the entrance piston includes an outer part which is separated by an end wall from an exhaust chamber which is connected with the atmosphere, the entrance piston includes an inner circumferential surface which is formed as a graduated hole, the entrance piston includes an inner part which is guided and moves longitudinally in the outer part;
(b) the inner part is formed as a hollow graduated piston which is complementary to the graduated hole, and the radial external graduated surfaces of the graduated piston are sealed against the corresponding surface of the graduated hole;
(c) the hollow graduated piston has a large end face which functions as an auxiliary control surface, and the hollow graduated piston includes an outlet sleeve which cooperates with the end wall of the outer part in a sealed manner to the exhaust chamber;
(d) the graduated piston has a small end surface which cooperates with a hollow valve tappet on which is located an outlet valve seat which activates the entrance valve;
(e) the external cylindrical surface of the outer part and a corresponding guide surface of the housing form a first annular chamber which is pressurized with the control pressure and a second annular chamber which is pressurized with the supply pressure;
(f) the auxiliary control surface of the graduated piston and the end wall of the outer part form an auxiliary control chamber which is connected with the first annular chamber; and
(g) a step formed between the outer part and the graduated piston which defines a holding chamber which is connected with the second annular chamber.

8. The load-dependent air brake pressure system, according to claim 5, wherein the entrance piston is composed of two parts which are urged against one another by a biasing control spring, and when pressure is exerted by the control pressure above a control pressure predetermined by the control spring, the two parts are pushed together whereby the one part activates the entrance valve.

9. The load-dependent air brake pressure system, according to claim 7, wherein:
(a) the holding chamber is sealed off from the supply pressure and is connected with the atmosphere; and
(b) the holding chamber has a control spring which is situated between the outer part and the graduated piston.

10. The load-dependent air brake pressure system, according to claim 9, wherein the second annular chamber which is located between the outer part of the graduated piston and the corresponding guide surface of the housing is omitted.

11. The load-dependent air brake pressure system, according to claim 7, wherein the first annular chamber is a graduated chamber having a larger portion adjacent the exhaust chamber.

12. The load-dependent air brake pressure system, according to claim 4, wherein the working means includes an auxiliary valve which is disposed between the entrance chamber and the accessory chamber, the auxiliary valve is preloaded by the supply pressure and is activated by the control pressure when a predetermined ratio between the control pressure and the delivery pressure is exceeded, the auxiliary valve closes the connection between the entrance chamber and the accessory chamber and establishes a connection between the control chamber and the accessory chamber.

13. The load-dependent air brake pressure system, according to claim 12, wherein the auxiliary valve is integral with the load-dependent brake pressure controller.

14. The load-dependent air brake pressure system, according to claim 13, wherein the auxiliary valve includes:
(a) a graduated bore and a hollow graduated piston guided and movable longitudinally whereby its radial external surfaces are sealed against the corresponding surfaces of the bore;
(b) the graduated piston includes a collar formed on its small end on which a first valve seat pointing toward the inside of the graduated piston is located, a double valve element is urged by a biasing spring against the inside surface of the graduated piston, the double valve element forms a first auxiliary inlet valve with a first valve seat and forms a second auxiliary inlet valve with a second valve seat;
(c) a control chamber is formed inside of the graduated piston which is pressurized with the control pressure;
(d) a step of the graduated piston is located between its large and medium diameter portions which functions as a holding chamber along with the housing which, when pressurized with the supply pressure, causes the closing of the first auxiliary inlet valve and moves the graduated piston against a stop;
(e) a double valve element is located in the small diameter portion of the graduated piston and is juxtaposed to a connection chamber which is connected via a hollow inlet tappet opposite the double valve element, the hollow tappet is part of the housing and forms a second valve seat, the connection chamber is connected to the entrance chamber through an accessory outlet and the accessory chamber;
(f) the second auxiliary inlet valve is located between the hollow inlet tappet and the accessory outlet; and
(g) the graduated piston is arranged in such a manner that when there is a movement under the action of the control pressure in the control chamber, and after the overcoming of the reaction force exerted by the supply pressure against the retaining surface, the graduated piston closes the second auxiliary inlet valve and opens the first auxiliary inlet valve, whereby the control chamber is connected to the connection chamber via the accessory outlet.

15. The load-dependent air brake pressure system, according to claim 12, wherein a connection is located between the entrance chamber and the accessory chamber in which is disposed an auxiliary valve prestressed which is biased by a control spring and is activated by the control pressure after the spring force is overcome by the control pressure and closes the connection between the entrance chamber and the accessory chamber and makes a connection between the control chamber and the accessory chamber.

16. The load-dependent air brake pressure system, according to claim 14, wherein the step of the graduated piston which forms the holding chamber is pressurized with atmospheric pressure.

17. The load-dependent air brake pressure system, according to claim 3, wherein the entrance piston takes the form of a graduated piston which cooperates with a graduated chamber which is in communication with the control chamber and/or with the control connection.

18. The load-dependent air brake pressure system, according to claim 1, wherein:
   (a) a relay valve is combined with the load-dependent brake pressure controller;
   (b) the relay valve is connected in series behind the control valve and is activated by a relay piston which is located coaxially beneath the brake pressure control piston;
   (c) the relay piston is pressurized by air pressure conveyed to a reaction chamber for opening the relay valve and modulated by pressure in the outlet chamber and for moving the relay valve in the opposite direction by the brake pressure exerted in the cylinders of the wheel brakes;
   (d) the reaction chamber is put in communication via the relay valve with a reservoir on the motor vehicle; and
   (e) the control element coaxially protrudes into the valve body of the relay valve and the relay piston and is guided in a sealed manner in the relay piston.

* * * * *